Jan. 21, 1964 D. R. COBURN 3,118,244
FISHING LURE
Filed Aug. 24, 1961

INVENTOR.
DONALD R. COBURN
BY
Price and Heneveld

United States Patent Office 3,118,244
Patented Jan. 21, 1964

3,118,244
FISHING LURE
Donald R. Coburn, 4286 Cascade Road SE.,
Grand Rapids, Mich.
Filed Aug. 24, 1961, Ser. No. 133,612
3 Claims. (Cl. 43—42.13)

This invention relates to fishing lures and more specifically to a fishing lure to be continuously moved through the water in representation of a plurality of small fish.

As is well-known to fishermen, in the sport of fishing the greatest excitement and enjoyment is not derived from the fish already in the bottom of the boat, but rather, is derived during the time interval starting with the first slight nibble, continuing with the light bite, the hooking of the fish, the resulting fight with the fish, and the final lift of the fish over the side of the boat. Because of this, fishing gear manufacturers have exerted great efforts to produce strong, but flexible and lightweight rods that are extremely sensitive and responsive to a fish's movements. To accommodate this type of rod, mono-filament lines are used on special spinning reels to enable the fisherman to respond rapidly to the fish's maneuvers, which are detected with the extraordinary "feel" on the light rod. As is well-known, such devices have achieved almost universal acceptance by fisherman.

In spite of the improved qualities of these rods, lines, and reels, there are several instances when this sensitive, lightweight, flexible equipment cannot be employed, however, due to the limitations caused by inferior lures. An important example of this exists with the employment of an inter-connecting group of conventional spinners or spoons to resemble a small school of minnows when dragged behind a boat. The tremendous water resistance and resulting drag from a connected group of conventional lures normally causes the use of a lightweight, flexible fly rod to be completely out of the question. Rather, heavy casting or trolling equipment is usually employed to drag the "school" lure behind the boat. Needless to say, it is impossible to "feel" a nibbling fish, or a lightly biting fish, or even the maneuvers of a hooked fish with such an apparatus.

In addition to this disadvantage, the groups of spinners or spoons involve such large water-flow resistance that the individual swivels which each lure is mounted upon is held so tightly that it in effect becomes a rigid joint. This causes the entire group of lures to rotate as a unit, thereby twisting the fishing line into a hopeless mess. The usual means employed in attempts to stabilize these lures have included the attachment of a rudder to the school of lures, or the attachment of a weight to the bottom of the multiple lures. Often, even these attempts do not stop the twisting. The resulting heavy, dragging mechanism is anything but sensitive. Consequently, many ardent fishermen shun this form of fishing since the true excitement and pleasure accompanying the strategic maneuvers of a fish are completely absent.

Yet, it is often advantageous to be able to cover large areas of water to obtain the maximum contact with meandering fish. Pulling a simulated school of fish behind a boat is the effective manner of attracting the attention of fish when covering such large areas, and yet with conventional lures, is simply not much of a sport.

It is therefore an object of this invention to provide a novel lure especially suited for use in groups to resemble a school of fish, but not possessing the ordinary disadvantages of groups of interconnected conventional lures. The novel lure enables fishermen to troll a large number of simulated minnows or fish behind the boat in a school fashion with negligible water resistance or drag. The lure may even be used with an ordinary fly rod and will cause only a small deflection due to water resistance, thereby enabling even a light bite to be readily sensed.

Another object of the inventive lure is to provide a group lure which not only has a minimal water-flow resistance, but which also is completely self-stabilizing in nature, thereby removing the second of the disadvantages formerly associated with group lures. The novel lure resembles actual minnows very closely in addition to the rotationally stable, and low-flow resistance characteristics.

It is another object of this invention to provide a lure which may be used in groups of very large numbers and which can be varied in size to be utilized as desired. For example, small lure elements can be used to catch perch and blue gills, larger elements can be used for trout, and still larger elements can be used for ocean fish, since the multiple lure is not limited in size by any water drag factor.

It is therefore an object of this invention to provide a lure which causes the group lure form of fishing to be attractive to sportsmen since the novel lure has enabled the use of flexible, sensitive equipment in a manner heretofore unknown. Other objects and advantages of the invention will occur to those in the art upon studying the following specification in conjunction with the drawings, in which.

Basically, the invention comprises a fishing lure having a plurality of platelike elements; some being helically oriented into a clockwise spiral, some being helically oriented in a counterclockwise spiral, with the clockwise and counterclockwise spirals being fixedly oriented on opposite sides of an elongated central support means or wire. The platelike elements are rotatably secured at one end to a plurality of intermediate support elements which extend laterally from the central support to which they are fixedly attached at one end. The elongated support preferably includes a line connecting means on the front end, and a hook connecting means on the tail end. The clockwise and counterclockwise elements are mounted in a balanced pattern. In one form of the invention, pairs of the elements are mounted directly opposite each other, and in a second form of the invention, the elements are mounted in a staggered pattern.

Figure 1:
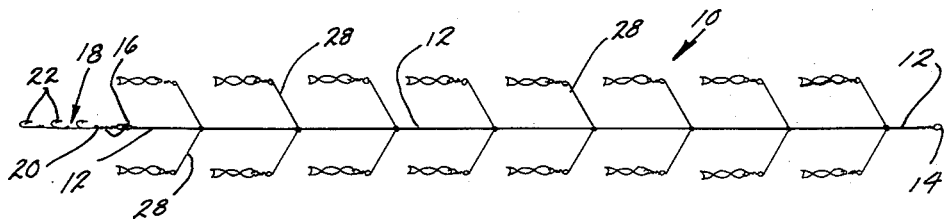
FIG. 1 is an elevational view of one form of the inventive lure.

Referring now to FIG. 1, the fishing lure 10 there disclosed includes an elongated central support means or wire 12 having suitable link connecting means such as a soldered loop 14, and a suitable hook connection means such as a soldered loop 16 at the rear end. A conventional crawler harness 18 including a snap swivel 20 and a plurality of suitable hooks 22 may be attached at loop 16.

Figure 2:
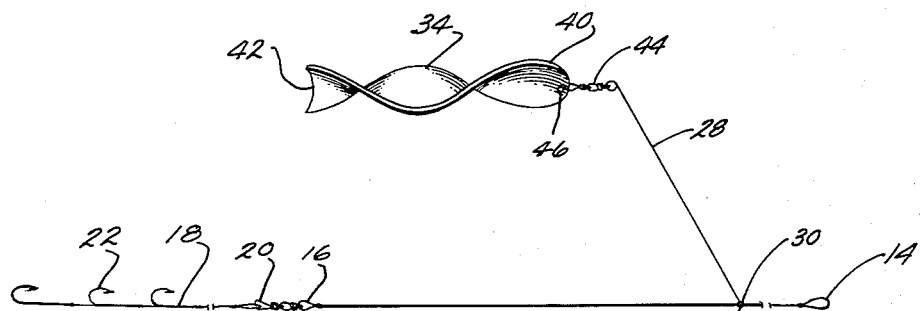
FIG. 2 is an enlarged elevational view of the form of the invention illustrated in FIG. 1 showing the individual components thereof in detail.

Fixedly secured along opposite sides of the elongated wire 12 are a plurality of laterally projecting wire supports 28 which are preferably fixedly connected to wire 12 as by a soldered connection 30 (FIG. 2). The purpose of this fixed connection 30 will be explained more fully hereinafter. Rotatably connected at the outer ends of each one of these lateral supporting means 28 is a pair of helically twisted or spiral elements 34 and 36. Each of these elements in its untwisted form basically comprises a plate-type generally rectangular structure, but preferably having a convex head end 40 and a concave tail end 42 to more closely resemble a fish. The rotatable connection between each element and the lateral support constitutes a conventional snap swivel 44 through eye 46.

In the form of the invention illustrated in FIGS. 1 and 2, the fixed lateral supporting elements 28 are positioned directly opposite each other. Each of the plurality of pairs on the composite lure includes one element 34 which is twisted or oriented in a counterclockwise manner.

It has been found that the stabilization of the balanced pattern of spiral elements is excellent. In order to achieve this the two differently twisted type of elements must be substantially opposite as shown in the drawings. The stabilization resulting from the balanced twisting forces is supplemented by the almost negligible water drag of the helical construction, even when used in large numbers and in large sizes. The low drag prevents the swivel joints on the individual elements from binding and acting as a rigid joint. This stabilization is further enhanced by the fixed connections at 30 since the elements are kept opposite to each other. The resulting composite lure has been found to be so stable when pulled through the water that no additional rudder means or weighting means is required to prevent the school lure from twisting. Further, the minimal drag of the helical elements enable the use of even an ordinary flexible fly rod, e.g. a split bamboo fly rod. It has been found that very little deflection of the rod occurs by dragging the novel school lure through the water. Thus, the maneuvers of a fish can now be readily detected even when using a large number of the pairs of elements. The most essential features of the invention are (1) the presence of both clockwise and counterclockwise helical elements, and (2) their positioning in a balanced pattern on opposite sides of the elongated support elements. Conceivably the soldered connection at 30, although important to the stabilization of a large group of such elements, could be substituted by a swivel connection as long as the oppositely twisted elements are kept opposite to each other.

It will be obvious that many lightweight materials may be used to form the platelike spirals, so long as a surface attractive to the fish may be imparted thereto. Although this type of element is spoken of as a "twisted element," since it will be normally formed by twisting a metallic material, this is intended to include molded plastic elements in which no actual twisting might have to be used.

Figure 3:
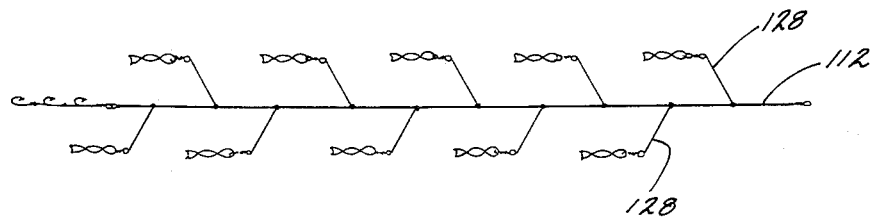
FIG. 3 is an elevational view showing a second form of the inventive lure.

In the second form of the invention illustrated in FIG. 3, the elongated central support 112 has attached thereto and extending laterally therefrom a plurality of secondary support elements 128 arranged in a balanced pattern substantially opposite to each other, but in a staggered relationship rather than directly opposite to each other. It is important here also that the oppositely oriented helical elements be positioned in a balanced pattern to achieve stability in the composite lure.

It will be obvious that the number of pairs of elements used, as well as the size of the individual platelike elements, may be varied depending upon the type of fish involved. Other obvious modifications will readily occur to those in the art without departing from the inventive principle taught. Such obvious modifications are deemed to be part of this invention, which is not to be limited to the illustrative forms shown, but only by the scope of the appended claims and the reasonably equivalent structures to those defined therein.

I claim:

1. A fishing lure, comprising: a central wirelike support means having means at its front end for securement to a fishing line; hook attachment means at the rear end of said wirelike support means; at least one pair of spiral platelike elements, one of the elements being twisted in a clockwise direction and the other in a counterclockwise direction; a second support means for each of said elements each fixedly secured to said wirelike support means and extending laterally therefrom; rotatable connecting means rotatably connecting each of the tip ends of said elements to said second support means permitting said elements to rotate in opposite directions along their longitudinal axis when pulled through the water whereby the rotational force about the wirelike support means created by the element twisted in the clockwise direction is balanced by the rotational force about the wirelike support means created by the element twisted in the counterclockwise direction to prevent the hook attachment means from unduly twisting and causing undue twisting of the hooks and fishing line to which the central wirelike support means is adapted to be attached.

2. The fishing lure as defined in claim 1 wherein said clockwise elements are positioned directly opposite similar counterclockwise elements with respect to said central wire-like support means.

3. The fishing lure as defined in claim 1 wherein said clockwise and counterclockwise elements are positioned in a staggered relationship along said central support.

References Cited in the file of this patent

UNITED STATES PATENTS

| | | |
|---|---|---|
| 418,200 | Loftie | Dec. 31, 1889 |
| 804,206 | Bruton | Nov. 14, 1905 |
| 1,451,656 | Halferty | Apr. 10, 1923 |
| 1,620,972 | Hobbs | Mar. 15, 1927 |
| 1,995,985 | Jennings | Mar. 26, 1935 |
| 2,167,945 | Gilliam | Aug. 1, 1939 |
| 2,266,234 | Mitchell | Dec. 16, 1941 |
| 2,281,578 | Heddon | May 5, 1942 |
| 2,467,151 | Nordquist | Apr. 12, 1949 |
| 2,665,516 | Race | Jan. 12, 1954 |
| 2,763,955 | Mead | Sept. 25, 1956 |

FOREIGN PATENTS

| | | |
|---|---|---|
| 67,128 | Norway | Nov. 29, 1943 |
| 76,474 | Norway | Aug. 13, 1951 |
| 94,477 | Norway | Aug. 17, 1959 |